(12) United States Patent
Studer et al.

(10) Patent No.: US 11,412,727 B2
(45) Date of Patent: Aug. 16, 2022

(54) LED LAMP ARRAY FOR INSECT TRAP

(71) Applicant: GARDNER MANUFACTURING CO., INC., Horicon, WI (US)

(72) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 0 days.

(21) Appl. No.: 17/493,057

(22) Filed: Oct. 4, 2021

(65) Prior Publication Data

US 2022/0022442 A1     Jan. 27, 2022

Related U.S. Application Data

(63) Continuation-in-part of application No. 16/733,277, filed on Jan. 3, 2020, now Pat. No. 11,134,667.

(51) Int. Cl.
| | |
|---|---|
| *A01M 1/08* | (2006.01) |
| *F21K 9/278* | (2016.01) |
| *F21S 4/28* | (2016.01) |
| *F21V 3/10* | (2018.01) |
| *F21Y 103/10* | (2016.01) |
| *F21Y 115/10* | (2016.01) |

(52) U.S. Cl.
CPC .............. *A01M 1/08* (2013.01); *F21K 9/278* (2016.08); *F21S 4/28* (2016.01); *F21V 3/10* (2018.02); *F21Y 2103/10* (2016.08); *F21Y 2115/10* (2016.08)

(58) Field of Classification Search
CPC .. A01M 1/08; A01M 1/04; F21K 9/278; F21S 4/28; F21V 3/10; F21Y 2103/10; F21Y 2115/10
See application file for complete search history.

(56) References Cited

U.S. PATENT DOCUMENTS

| | | | |
|---|---|---|---|
| 4,876,822 A | 10/1989 | White | |
| 6,393,759 B1 | 5/2002 | Brown et al. | |
| 2018/0184635 A1* | 7/2018 | Studer | ............ A01M 1/04 |

FOREIGN PATENT DOCUMENTS

| | | | |
|---|---|---|---|
| CN | 203097344 U | * | 7/2013 |
| JP | 2016165277 A | * | 9/2016 |

(Continued)

OTHER PUBLICATIONS

Machine English Translation of KR20200115404A; Wang et al. Oct. 2020.*

(Continued)

*Primary Examiner* — Rajarshi Chakraborty
*Assistant Examiner* — Glenn D Zimmerman
(74) *Attorney, Agent, or Firm* — Bradley J. Thorson; DeWtt LLP

(57) ABSTRACT

Problems associated with the use of fluorescent tubes in insect traps are resolved by providing a replacement lamp array employing multiple sets of light emitting diodes that each emit light at different specific wavelengths and are positioned within a one or more translucent sleeves having a surface coated with an environmentally safe light diffusion material creating a pattern comprising areas of more intense light dominated by the light cast by a single LED separated by areas of less intense light.

16 Claims, 6 Drawing Sheets

(56) References Cited

FOREIGN PATENT DOCUMENTS

| | | |
|---|---|---|
| JP | 2016208944 | 12/2016 |
| JP | 2019058124 | 4/2019 |
| KR | 1020140010493 | 1/2014 |
| KR | 1020200115404 | * 10/2020 |

OTHER PUBLICATIONS

International Searching Authority, Korean Intellectual Property Office, Notification of Search Report, International Search Report and Written Opinion of the International Searching Authority for related International Application No. PCT/US2020/056564, dated Jan. 29, 2021, 9 pages.

* cited by examiner

| LED | Set / Subset | Wavelength | Color |
|---|---|---|---|
| 52 | First | 315 to 400 nanometers | Ultraviolet |
| 55 | First | 315 to 400 nanometers | Ultraviolet |
| 57 | First | 315 to 400 nanometers | Ultraviolet |
| 60 | First | 315 to 400 nanometers | Ultraviolet |
| 54 | Second | 2700K to 6500K | White |
| 58 | Second | 2700K to 6500K | White |
| 56 | Third / First | 510 to 545 nanometers | Green |
| 51 | Third / Second | 565 to 575 nanometers | Lime Green |
| 61 | Third / Second | 565 to 575 nanometers | Lime Green |
| 53 | Third / Third | 575 to 600 nanometers | Yellow |
| 59 | Third / Third | 575 to 600 nanometers | Yellow |

*Fig. 4*

LED LAMP ARRAY FOR INSECT TRAP

CROSS-REFERENCED TO RELATED APPLICATIONS

This application is a continuation-in-part of U.S. application Ser. No. 16/733,277, filed Jan. 3, 2020, by Studer et al. and entitled "LED LAMP FOR INSECT TRAP".

STATEMENT REGARDING FEDERALLY SPONSORED RESEARCH OR DEVELOPMENT

Not applicable.

BACKGROUND OF THE INVENTION

I. Field of the Invention

The present invention relates generally to insect traps employing a light source as an insect attractant. More specifically, the present invention relates to an improved light emitting diode (LED) lamp for such traps.

II. Discussion of Related Art

Flying insect traps manufactured over the last thirty years have typically incorporated the basic design elements disclosed by James White in U.S. Pat. No. 4,876,822 granted on Oct. 31, 1989. These elements include a housing, a ballast, a starter, an ultraviolet fluorescent tube powered by the starter and ballast, and a glue board. Ultraviolet light emitted by the fluorescent tube attracts flying insects to the interior of the housing. Flying insects landing on the glue board adhere to the glue board and are thus trapped.

Variations of this basic design exist. In many traps, for example, an electrocution grid that kills insects entering the trap is substituted for the glue board. In other traps, insect attracting scents are employed in addition to (or in lieu of) the fluorescent tube.

Fluorescent tubes are a specific type of gas-charged luminaire that produce light through a chemical reaction occurring inside a glass tube. More specifically, that chemical reaction involves gases and mercury vapor interacting to produce ultraviolet light. For general lighting, the inside of the tube is coated with a phosphor coating. This coating emits a white "fluorescent" light. This coating is either less densely applied or eliminated altogether in the ultraviolet fluorescent tubes used in flying insect traps.

Since 1989, environmental and pest control experts have identified problems with fluorescent tubes. First, the mercury and the phosphorus materials inside a fluorescent tube are hazardous. If the tube breaks, the surrounding environment is contaminated by the mercury. The phosphor on the broken glass is potentially even more hazardous. The U.S. Environmental Protection Agency, in recognition of these hazards, has published recommendations related to cleaning up a broken fluorescent tube.

Disposal of fluorescent tubes, even when not broken, is problematic. Various governmental regulations exist requiring special disposal separate from general commercial and household waste.

Fluorescent tubes age and degrade significantly over a relatively short period of time. Most ultraviolet fluorescent tubes used in insect traps only emit optimum ultraviolet light attractive to flying insects for up to 8000 hours. This is less than a year if the tube is energized continuously, as is commonly the case. As such, pest control experts and trap manufacturers recommend replacing the tube at least once a year.

While the glue boards and fluorescent tubes needs to be regularly replaced, the housings, starters and ballasts can last for decades.

Today there is a real need for a lamp adapted to (a) generate light that is highly attractive to flying insects over a long period of time, (b) be installed in a standard flying insect trap without modification or removal of the electronic components external to the lamp (e.g., the starter or ballast), and (c) overcome each of the problems associated with the use of ultraviolet fluorescent tubes.

SUMMARY OF THE INVENTION

The foregoing problems are solved by a flying insect trap lamps made in accordance with the present invention. Such lamps typically include a translucent sleeve. The sleeve has a cylindrical substrate (surface) coated with fluorinated ethylene propylene. An elongate mounting panel is positioned within the sleeve. A plurality of light emitting diodes (LEDs) are mounted on the elongate mounting panel and positioned, along with the elongated mounting panel, within the translucent sleeve.

For optimal insect attraction, three sets of light LEDs are provided. Each LED of the first set operates to emit light having a wavelength in the range of 315 to 400 nanometers. Each LED of the second set operates to emit light having a wavelength in the range of 400 to 700 nanometers, i.e., white light, having a color temperature of 2700 to 6500 Kelvin. Each LED of the third set emits light having a wavelength in the range of 510 to 600 nanometers.

The third set of LEDs may have three distinct subsets. The LEDs of the first subset emit light within the range of 510 to 545 nanometers. The LEDs of the second subset emit light within the range of 565 to 565 nanometers. The LEDs of the third subset emit light in the range of 575 to 600 nanometers.

The lamp is designed to be installed in fixtures designed for use with fluorescent tubes without modification of the preexisting circuitry external to the lamp. As such, the lamp of the present invention includes the same four pin connectors found on a standard fluorescent tube. Electrical current is delivered to the lamp by the circuitry of the trap external to the lamp in the same manner as when a standard fluorescent tube is installed.

Such current, if applied directly to a standard set of LEDs, would quickly destroy the LEDs and generate too much heat. Therefore, the lamp of the present invention includes internal circuitry physically positioned within the sleeve and electrically mounted between the connecting pins and the LEDs. This circuitry includes a power supply that adapts the current and voltage to safely power the LEDs. This power supply will typically include an A/D converter. For example, the A/D converter may comprise a pair of bridge rectifiers including a total of eight discrete diodes to rectify the electrical input provided to the pins of the lamp via the external circuitry of the trap, including any ballast or starter that is present. The power supply will also rectify the current supplied to the lamp even if a ballast and/or starter are not present in the external circuitry. The power supply will also typically include a voltage regulator and a capacitor. As such, the lamp of the present invention is universal in the sense that it may be used in either (a) preexisting traps with a starter and/or ballast in place, (b) pre-existing traps of which the starter and/or ballast has been removed, or (c) traps specifically designed for use with LED lamps rather than fluorescent tubes.

In addition to the power supply, the internal circuitry of the lamp will include an LED controller. The controller may be adapted to cause the LEDs to provide steady light, flickering light, or provide light in patterns. In certain cases, the patterns involve turning individual LEDs (or groups of LEDs) on and off. In other cases, the patterns involve modulating the intensity or the wavelength of the light illuminated by individual LEDs or groups of LEDs. Such patterns can be predetermined or random depending on how the controller is programmed. A switch (or series of switches) may be employed to alter the lamp between a steady light mode, a flickering light mode, and such pattern modes. Alternatively, the controller may have a radio frequency module, such as a Bluetooth or WIFI transceiver. Such a transceiver is adapted to allow remote switching between modes or to create new modes providing a different pattern. The flickering mode may emulate the flickering associated with ultraviolet fluorescent tubes.

Alternatively, a flying insect trap may be provided with an attractive lamp array. The lamp array will preferably include at least three separate lamps, and a controller coupled to each of the lamps and adapted to individually control the intensity of the light produced by each of the lamps.

For examples, the lamp array may comprise three lamps. The first of the three lamps may include a first housing that is transparent or translucent, a first set of light emitting diodes each having a wavelength in the range of 315 to 400 nanometers positioned within the first housing, and a first pair of connectors electrically coupled to each of the light emitting diodes of the first set of light emitting diodes. The second of the three lamps may include a second such housing, a second set of light emitting diodes each having a wavelength in the range of 400 to 700 nanometers positioned within the second housing, and a second pair of connectors electrically coupled to each of the light emitting diodes of the second set of light emitting diodes. The third of the three lamps may include a third such housing, a third set of light emitting diodes each having a wavelength in the range of 510 to 600 nanometers positioned within the third housing, and a third pair of connectors electrically coupled to each of the light emitting diodes of the third set of light emitting diodes.

In alternative embodiments, additional lamps made in a similar fashion may be added to the array without deviating from the invention. Such additional lamps may include sets of light emitting diodes each operating within a different wavelength range than those ranges specified above. Likewise, any of the lamps may include light emitting diodes capable of operating within different ranges of wavelengths such that the controller can control select the specified range within which the light emitting diodes of the lamp emit light.

The controller is coupled to each of the lamps and is adapted to control the intensity of light emitted from the lamps, i.e., turn the light emitting diodes of the lamps on and off and adjust their brightness when on. Using dimmable light emitting diodes in at least some of the lamps will improve the efficiency of the trap.

The controller also has a plurality of selectable modes of operation and separately controls the intensity of the lamps based on the mode selected. Selecting the mode made be done in any well-known manner such as actuating dip switches or through remote control depending on the specific design of the controller.

BRIEF DESCRIPTION OF THE DRAWINGS

The features and attributes which may be employed to practice the present invention will be better understood from a review of the detailed description provided below in conjunction with the accompanying drawings.

FIG. 4 is a table illustrating the wavelength/color values of the LEDs used in a combination found effective for attracting flying insects.

DETAILED DESCRIPTION

Figure 1:
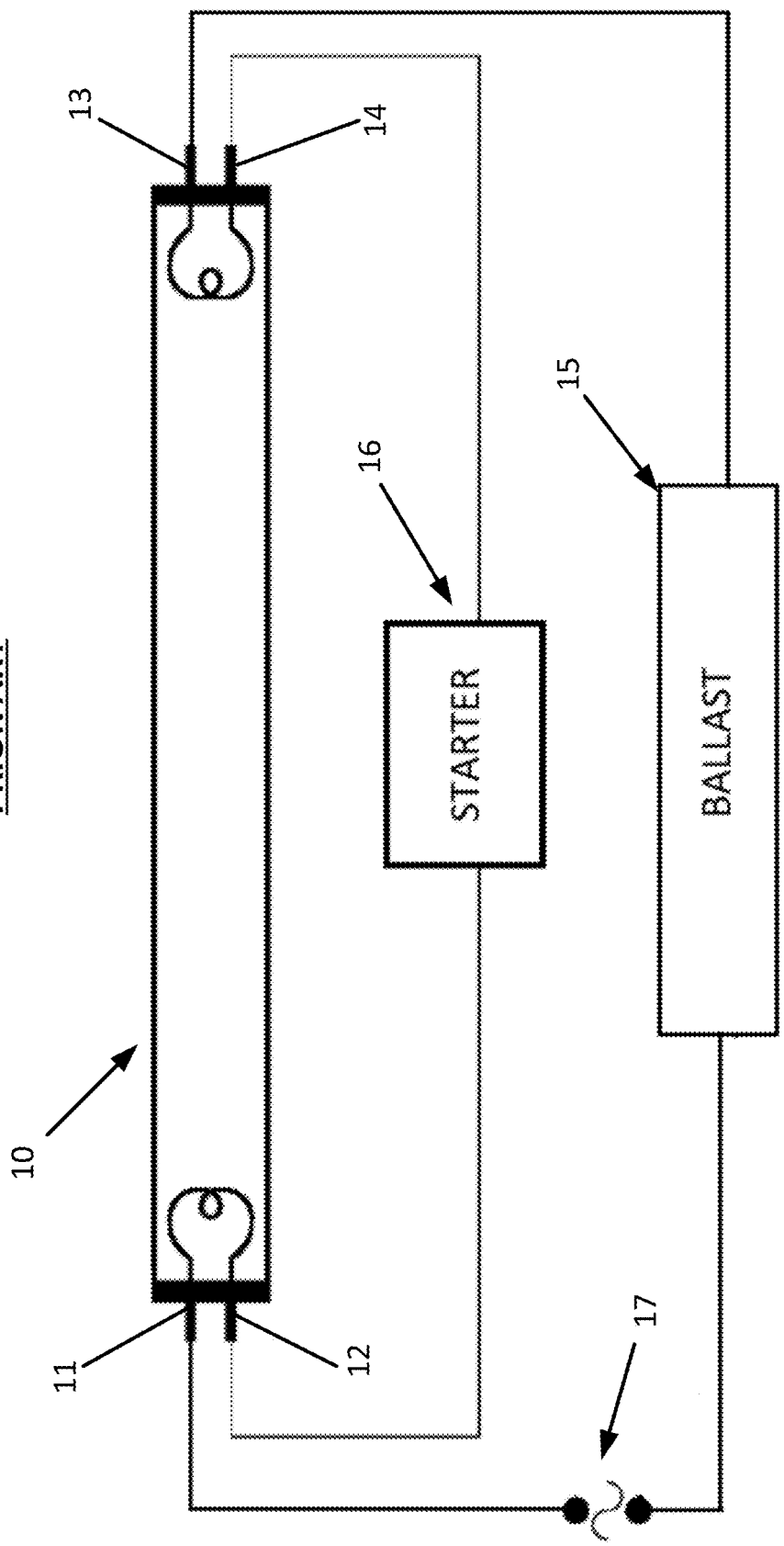
FIG. 1 is a schematic diagram a standard circuit employed in prior art insect traps to power an ultraviolet fluorescent tube.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

An exemplary electronic circuit of the type typically employed in prior art insect light traps is shown in FIG. 1. This electronic circuit includes a fluorescent tube 10 having four pins, 11, 12, 13, and 14. The circuit of FIG. 1 also includes a ballast 15, a starter 16, and an alternating current input 17 which may be a plug adapted to connect the circuit to a standard electrical wall receptacle to supply power to the circuit.

Figure 2:
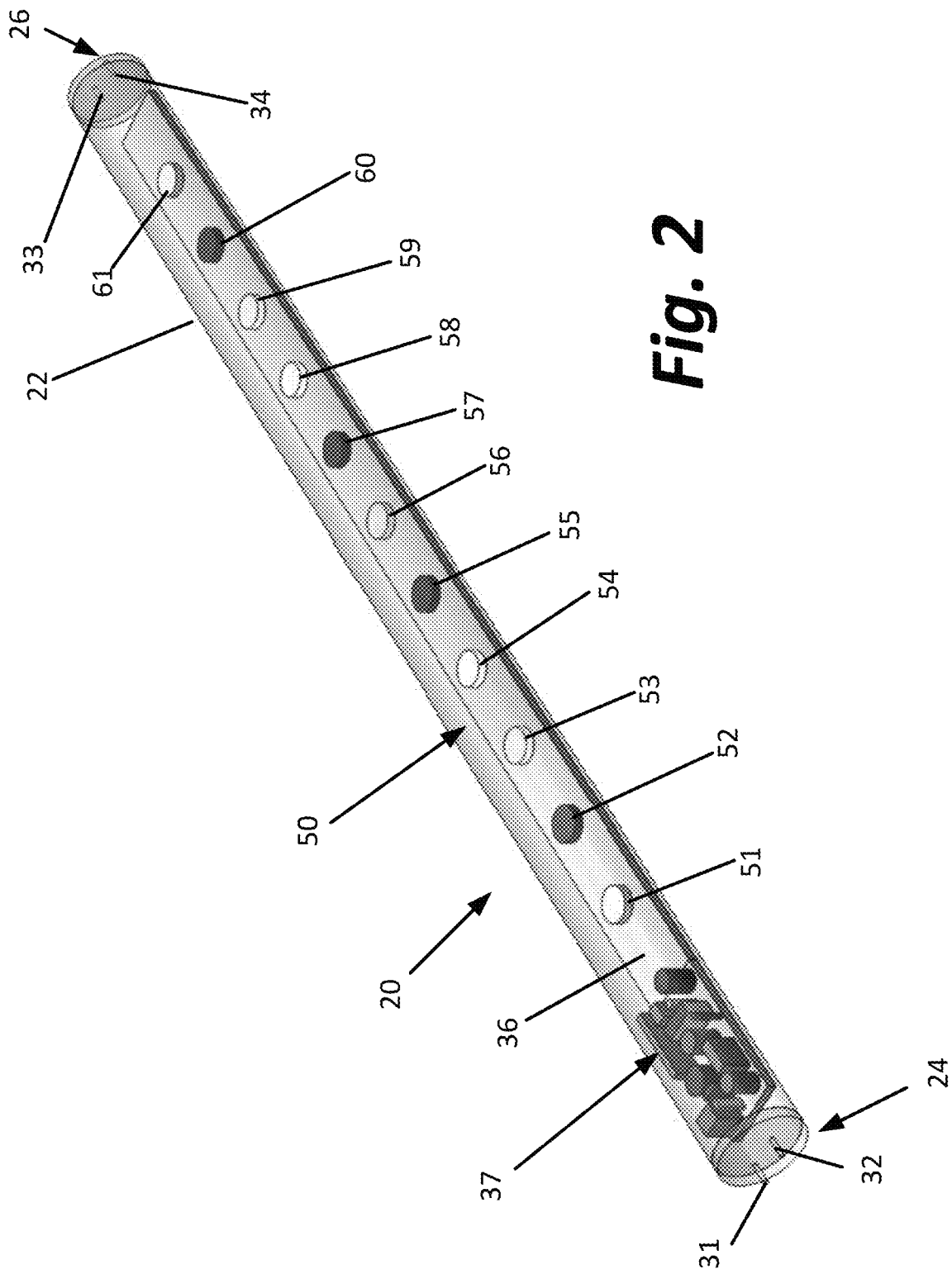
FIG. 2 is a perspective view of an exemplary embodiment of the present invention.
Figure 3:
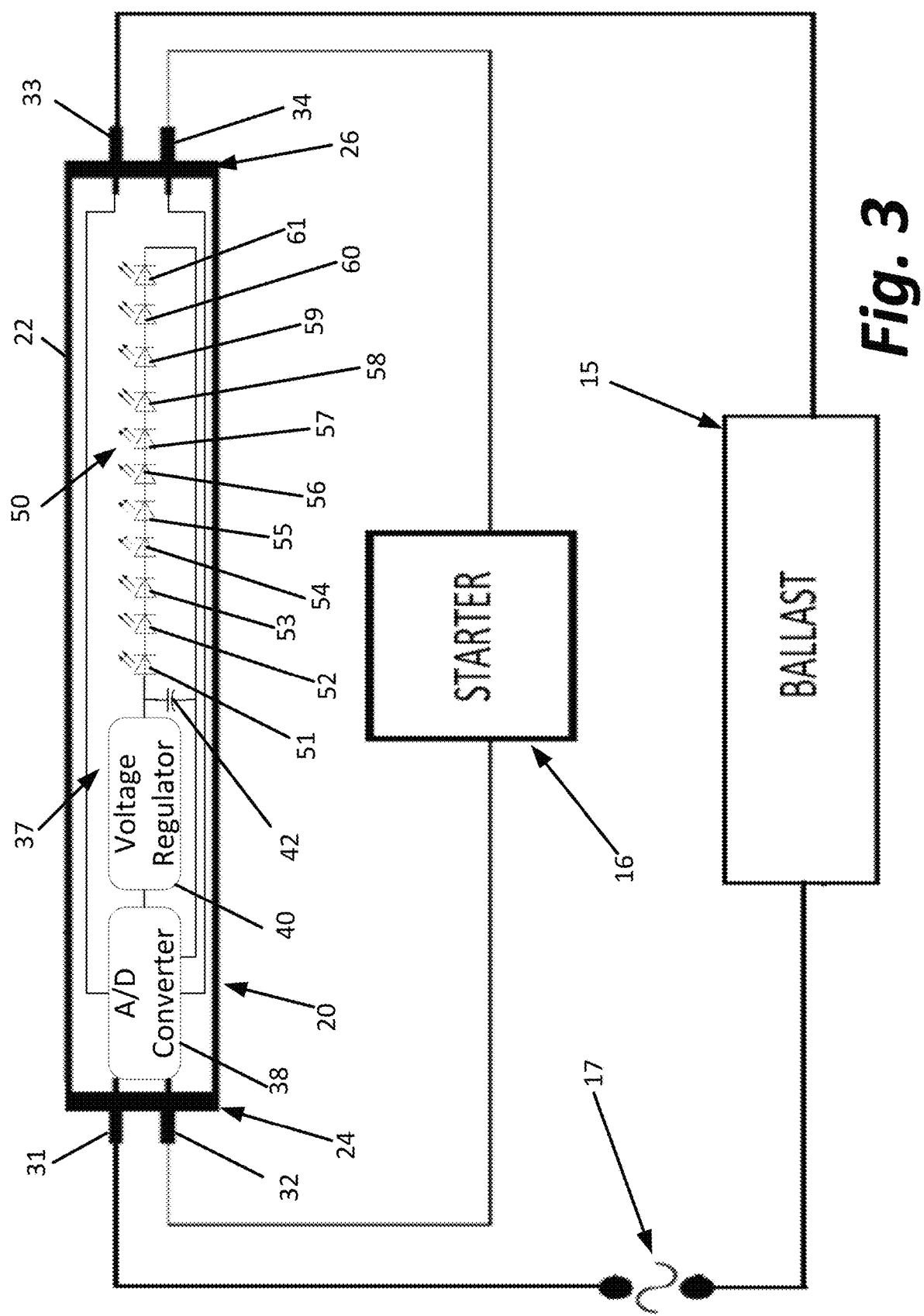
FIG. 3 is a schematic diagram of the embodiment of FIG. 2.

One goal of the present invention is to provide an LED lamp that may be used to replace the fluorescent tube 10 without removal of the ballast 15 and starter 16. Another goal of the present invention is to provide an LED lamp that may also be employed if either or both the ballast 15 and starter 16 are not a part of the circuit. Such an LED lamp 20 is illustrated in FIGS. 2 and 3.

As shown, the lamp 20 includes a translucent sleeve 22. The translucent sleeve 22 comprises a substrate made of glass or some other ultraviolet light transmissive material. No phosphorous material is applied to the substrate. Instead the substrate is coated with fluorinated ethylene propylene. As such, the translucent sleeve of this embodiment of the present invention shown in FIGS. 2 and 3 eliminates altogether the environmental concerns associates with the mercury and phosphorous materials found in standard fluorescent tubes.

The opposite ends of the translucent sleeve 22 are capped with connectors 24 and 26. Connector 24 has a pair of contact pins 31 and 32. Connector 26 also has a pair of contact pins 33 and 34. The physical arrangement of pins 31, 32 33 and 34 is identical to that of the pins 11, 12, 13, and 14 found in a standard fluorescent tube.

Located within the translucent sleeve 22 is a mounting panel 36. Physically mounted to the mounting panel 36 and residing within the translucent sleeve 22 is an internal circuit 37. Internal circuit 37 includes a power supply 38. The power supply 38 comprises an alternating current to direct current ("A/D") converter. The A/D converter 38 may be of any suitable design. It may, for example, comprise a pair of bridge rectifiers. The power supply 38 is coupled to each of pins 31 through 34. Pin 31 is also directly and electrically coupled to a source of alternating current 17. Pin 33 is also electrically coupled to the source of alternating current 17, but via the ballast 15. Pins 32 and 34 are electrically coupled together via the starter 16.

The power supply 38 further comprises a voltage regulator and may also include a capacitor. The voltage regulator functions to control the voltage and capacitor smooths the output of the A/D converter. The capacitor may, of course, simply be a component of the A/D converter.

The power supply 38 described above is adapted to provides direct current power of a proper voltage to an LED controller 40. The controller 40 preferably has at least one mode of operation, and may have multiple modes of operation. The controller 40 is coupled to and controls an LED array 50 portion of circuit 36. As shown, the LED array 50 comprises eleven LEDs 51-61. The LEDs 51-61 are connected in series to the LED controller 40.

To provide a lamp having light characteristics attractive to flying insects, three sets of light LEDs are provided in the circuit 37. Each LED of the first set operates to emit light having a wavelength in the range of 315 to 400 nanometers. As shown in FIGS. 2 and 3, this set includes four LEDs, more specifically LEDs 52, 55, 57 and 60. Each LED of the second set operates to emit light having a wavelength in the range of 400 to 700 nanometers, i.e., white light having a color temperature in the range of 2700 to 6500 Kelvin. As shown in FIGS. 2 and 3, this set includes LEDs 54 and 58. Each LED of the third set emits light having a wavelength in the range of 510 to 600 nanometers. As shown in FIG. 3, this set includes 51, 53, 56, 59, 61. The number of LEDs in each set may vary from what is shown without deviating from the invention.

The third set of LEDs may have three distinct subsets. The LEDs of the first subset emit light within the range of 510 to 545 nanometers. As shown in FIG. 3, this first subset includes a single LED, specifically LED 56. The LEDs of the second subset emit light within the range of 565 to 575 nanometers. As shown in FIG. 3, this second subset includes LEDs 51 and 61. The third subset includes LEDs 53 and 59. LEDs 53 and 59 emit light in the range of 575 to 600 nanometers. This arrangement and grouping of LEDs are further illustrated in the table of FIG. 4

When the lamp of the present invention is energized, each of the LEDs generate light as described above and illustrated in FIG. 4. The light that exits the translucent sleeve 22 is not highly specular but is instead somewhat diffused by the fluorinated ethylene propylene coating applied to the substrate. The result is a pattern highly attractive to insects on the surface of the sleeve and cast by the lamp onto adjacent surfaces such as that of a glue board of the trap. This pattern includes areas of more intense light dominated by the light cast by each single LED separated by areas of less intense light where light cast by adjacent LEDs is more mixed.

Figure 5:
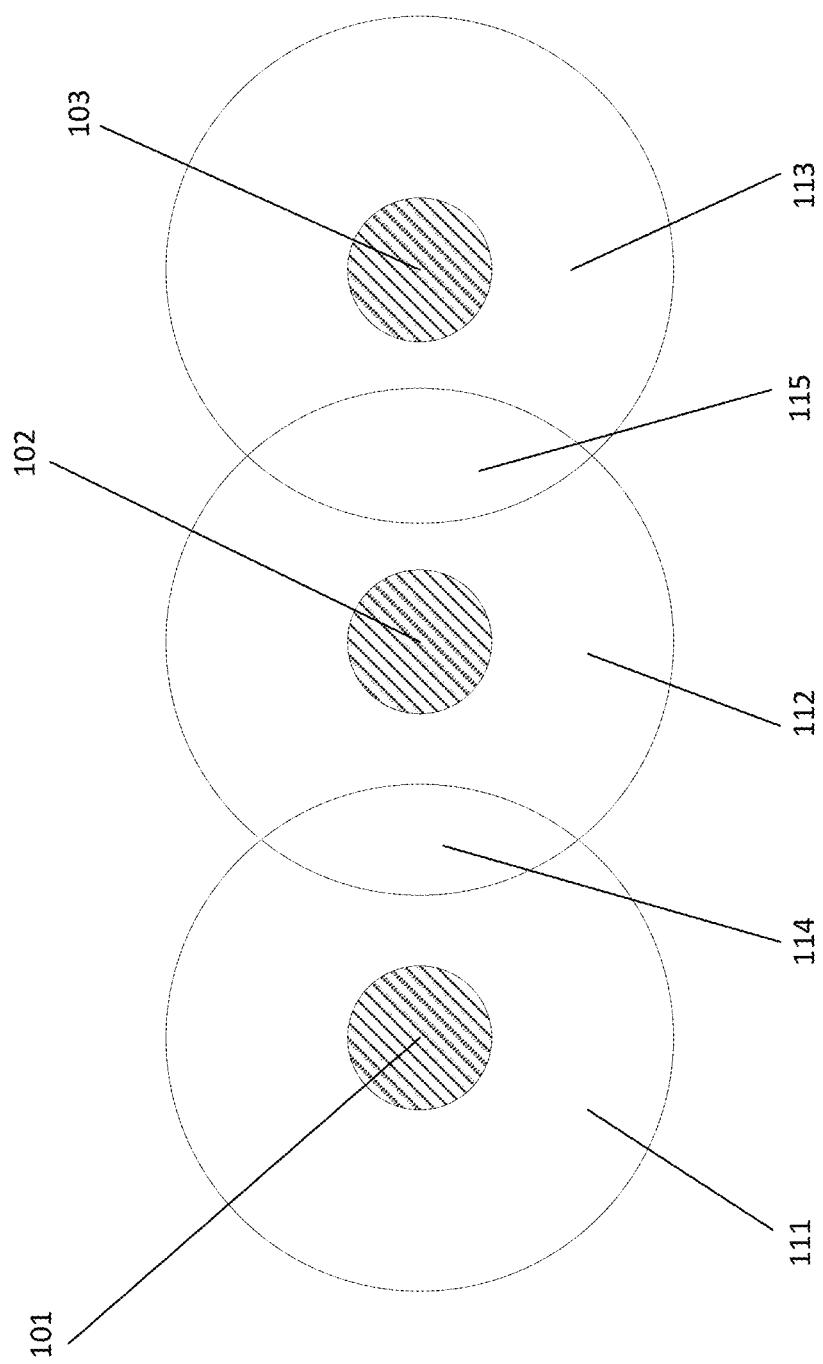
FIG. 5 is a schematic diagram of a portion of a light pattern generated by the embodiment of FIG. 2.

More specifically and as illustrated in FIG. 5, the light of any three of the LEDs will create on the surface of the translucent sleeve 22 areas of intense light such as 101, 102 and 103. These areas of intense light are surrounded by areas of less intense light 111, 112 and 113. These areas of less intense light intersect, such that areas of mixed light 114 and 115 are created. Of course, in practice the areas of intense light, less intense light, and mixed light do not have the discrete boundaries suggested by FIG. 5.

As noted above, the controller 40 may have a single mode of operation, or may be adapted to be switched between multiple selectable modes of operation. One of said modes of operation may cause each of the LEDs 51-61 to be steadily illuminated at their respective wavelengths, as described above.

Another of said modes of operation may cause each of the LEDs 51-61 to cycle in a flickering fashion between an illuminated state at their respective wavelengths and a non-illuminated state so that the overall effect is more like the light generated by a UV fluorescent tube. Alternate modes may also be provided. These alternate modes may include cycling the different sets of LEDs on and off in predetermined or random patterns. These alternate modes may also include cycling the individual LEDs of a set of LEDs on and off in a predetermined or random pattern. The controller may also be adapted to modulate the intensity or wavelength of the light generated by the LEDs. Such modulation may occur either prior to illumination of an LED so the light emitted is at a steady wavelength and intensity or such modulation may occur so that the wavelength or intensity of the light emitted changes during illumination.

Changing between modes may be accomplished in several ways. First, one or more switches (not shown) may be electrically coupled to the controller 40. Such switches may be physically actuated during or after installation of the lamp. Alternatively, the controller 40 may further include a radio frequency transceiver. Examples suitable for use include Bluetooth and WIFI transceivers. When the controller 40 includes such a transceiver, the controller 40 may be adapted to respond to signals received via the transceiver to switch between modes or to be programmed with new modes. Such new modes may provide different sequences in which the LEDs are either turned on and off or the wavelength or intensity of the light generated by the LEDs is modulated.

Figure 6:
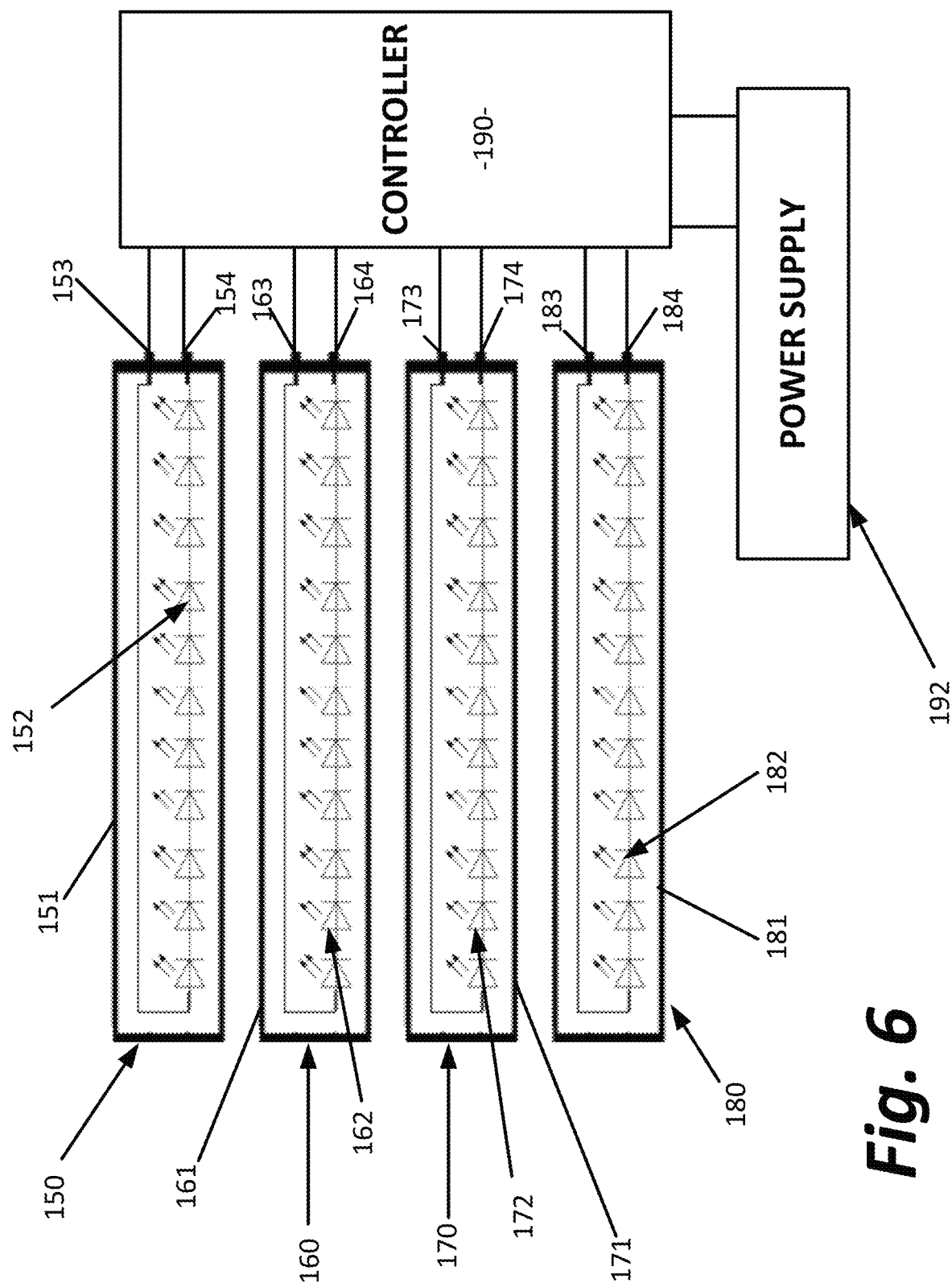
FIG. 6 is a schematic diagram of an alternative embodiment of the present invention.

A flying insect trap may be provided with an attractive lamp array as shown in FIG. 6. The lamp array will preferably include a plurality of separate lamps. In FIG. 6, four such lamps 150, 160, 170 and 180 are shown. The attractive lamp array also includes a controller 190 coupled to each of the lamps and adapted to individually control the intensity of the light produced by each of the lamps. A power supply 192 is also shown. This power supply energizes the controller 190 and each of the lamps 150, 160, 170 and 180 via the controller 190.

Each of the lamps are constructed in an identical fashion. Lamp 150 includes a first housing 151 that is transparent or translucent at least with respect to light in the wavelength range produced by the lamp 150. Within the housing 151 is positioned a first set of light emitting diodes 152. Each light emitting diode of set 152 produce light at a wavelength in the range of 315 to 400 nanometers. A first pair of connectors 153/154 are electrically coupled to each of the light emitting diodes of the first set of light emitting diodes 152.

Lamp 160 includes a second housing 161 that is transparent or translucent at least with respect to light in the wavelength range produced by the lamp 160. Within the housing 161 is positioned a second set of light emitting diodes 162. Each light emitting diode of set 162 produce light at a wavelength in the range of 400 to 700 nanometers. A second pair of connectors 163/164 are electrically coupled to each of the light emitting diodes of the second set of light emitting diodes 162.

Lamp 170 includes a third housing 171 that is transparent or translucent at least with respect to light in the wavelength range produced by the lamp 170. Within the housing 171 is positioned a third set of light emitting diodes 172. Each light emitting diode of set 172 produce light at a wavelength in the range of 510 to 600 nanometers. A third pair of connectors 173/174 are electrically coupled to each of the light emitting diodes of the third set of light emitting diodes 172.

FIG. 6 also shows a fourth lamp 180. Like the lamps 150, 160 and 170, lamp 180 includes a housing 181 that is transparent or translucent at least with respect to light in the wavelength range produced by the lamp 180. Within the housing 181 is positioned a fourth set of light emitting diodes 182. Each light emitting diode of set 182 produce light within a selected wavelength range. The selected range may be the same range as one of the other lamps 150, 160 or 170 or may be an entirely different range. For example, the light emitting diodes of the fourth lamp may produce light in the range of 2700 5000K to emulate daylight. A fourth pair of connectors 183/184 are electrically coupled to each of the light emitting diodes of the fourth set of light emitting diodes 182.

Additional lamps made in a similar fashion to lamps 150, 160, 170 and 180 may be added to the array without deviating from the invention. Such additional lamps may include sets of light emitting diodes each operating within a different wavelength range than those ranges specified above or any of the above identified ranges. Likewise, any of the lamps may include light emitting diodes capable of operating within different ranges of wavelengths such that the controller 190 can control and select the specified range within which the light emitting diodes of the lamp emit light.

The controller 190 is coupled to each of the lamps 150, 160, 170 and 180 (and any additional lamps of the array) and is adapted to control the intensity of light emitted from each of the lamps, i.e., turn the light emitting diodes of the lamp on and off and adjust their brightness when on. Using dimmable light emitting diodes in at least some of the lamps will improve the efficiency of the trap. Alternatively, the brightness of a lamp can be controlled by the controller selecting which of the light emitting diodes of the lamp's array of light emitting diodes to turn on and leave off. This also allows the set of light emitting diodes of the bulb to generate different patterns of light on the surface of the lamp's housing or adjacent structures.

The controller 190 has a plurality of selectable modes of operation and individually controls the intensity of the lamps based on the mode selected. In some modes, all the lamps will be on. In other modes only some of the lamps will be on. In still other modes some of the lamps with shine brighter than others. In still other modes, some lamps may be caused to flicker. This is possible because the controller 190 is adapted to control each lamp individually and such control includes turning a lamp on or off, adjusting the brightness of the lamp when on, modulating the brightness of the lamp when on between different levels of intensity in either a random or controlled pattern, or causing the lamp to flicker on and off in either a random or controlled pattern. The selected mode will be based in large part on the type of insect the user wishes to attract with the light array. Moths, for example, will be attracted to a different light output and pattern than flies or mosquitos.

Selecting the mode made be done in any well-known manner such as actuating dip switches or through remote control depending on the specific design of the controller 190. As discussed above with respect to controller 40, one or more switches (not shown) may be electrically coupled to the controller 190. Such switches may be physically actuated during or after installation of the lamp. Alternatively, the controller 190, like controller 40, may further include a radio frequency transceiver. Examples suitable for use include Bluetooth and WIFI transceivers. When the controller 190 includes such a transceiver, the controller 190 may be adapted to respond to signals received via the transceiver to switch between modes or to be programmed with new modes.

The foregoing description is intended to explain the various features and advantages but is not intended to be limiting. The scope of the invention is defined by the following claims which are also intended to cover a reasonable range of equivalents.

What is claimed is:

1. An insect trap comprising an attractive lamp array having: (a) a first lamp including a housing, a first set of light emitting diodes each having a wavelength in the range of 315 to 400 nanometers positioned within the first housing, and a first pair of connectors electrically coupled to each of the light emitting diodes of the first set of light emitting diodes; (b) a second lamp including a second housing, second set of light emitting diodes each having a wavelength in the range of 400 to 700 nanometers positioned within the second housing, and a pair of second connectors electrically coupled to each of the light emitting diodes of the second set of light emitting diodes, (c) a third lamp including a housing, a third set of light emitting diodes each having a wavelength in the range of 510 to 600 nanometers positioned within the third sleeve, and a third pair of connectors electrically coupled to each of the light emitting diodes of the third set of light emitting diodes, and (d) a controller adapted to be coupled to said first, second and third pairs of connectors, and wherein said controller has a plurality of selectable modes of operation and individually controls the intensity of the light produced by the first lamp, the second lamp and the third lamp based upon which mode of operation is selected.

2. The insect trap of claim 1 further comprising at least one additional lamp including additional light emitting diodes each having a wavelength in the range that is the same as the range of a selected one of the first, second and third lamps.

3. The insect trap of claim 1 further comprising at least one additional lamp including additional light emitting diodes each having a wavelength in the range that is different than the range of each of the first, second and third lamps.

4. The insect trap of claim 1 the first housing, the second housing, and the third housing each comprise a translucent sleeve made of an ultraviolet light transmissive material and having a surface coated with fluorinated ethylene propylene.

5. The insect trap of claim 1 wherein the controller is adapted to selectively and individually turn the first, second and third lamps on and off.

6. The insect trap of claim 1 wherein each of the light emitting diodes of at least one of the first, second and third sets of light emitting diodes are dimmable light emitting diodes.

7. The insect trap of claim 1 wherein each of the light emitting diodes of the first, second and third set of light emitting diodes are dimmable light emitting diodes.

8. The insect trap of claim 1 wherein the controller to individually select which light emitting diodes of at least one of the first, second and third set of light emitting diodes turn on and leave off for brightness control.

9. The insect trap of claim 1 further comprising a power supply.

10. The trap of claim 1 wherein the controller is adapted to cause the light emitting diodes of at least one of the first, second and third sets of light emitting diodes to flicker.

11. The insect trap of claim 1 wherein the controller is adapted to the intensity of the light produced by the light emitting diodes of at least one of the first, second and third sets of light emitting diodes.

12. The insect trap of claim 1 wherein the controller has a plurality of modes of operation.

13. The insect trap of claim 12 wherein in at least a first of said plurality of modes of operation the first set, second set and third set of light emitting diodes are individually cycled on and off in pattern.

14. The insect trap of claim 12 wherein in at least a second of said plurality of modes of operation the light emitting diodes of at least one of the first set, second set and third set of light emitting diodes are individually cycled on and off in pattern.

15. The insect trap of claim 12 wherein in at least a third of said plurality of modes of operation the light emitting diodes of at least one of the first set, second set and third set are dimmer than the light emitting diodes of another of the first, second, and third set of light emitting diodes.

16. The insect light trap of claim 12 wherein in at least a fourth of said plurality of modes of operation one of the first, second and third lamps is dimmer than another of said first, second and third lamps.

* * * * *